(12) United States Patent
Yu et al.

(10) Patent No.: US 6,721,277 B1
(45) Date of Patent: Apr. 13, 2004

(54) GENERIC REGISTER INTERFACE FOR ACCESSING REGISTERS LOCATED IN DIFFERENT CLOCK DOMAINS

(75) Inventors: Ching Yu, Santa Clara, CA (US); Jeffrey Dwork, San Jose, CA (US); John Chiang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/321,086

(22) Filed: May 28, 1999

(51) Int. Cl.[7] .............................................. G01R 31/08
(52) U.S. Cl. ...................... 370/251; 375/354; 709/237
(58) Field of Search ................................ 370/278, 389, 370/412, 432, 503, 519, 352, 392, 463, 251; 375/354; 709/216, 237; 710/28, 36; 714/731

(56) References Cited

U.S. PATENT DOCUMENTS

| | | | | |
|---|---|---|---|---|
| 4,590,467 A | * | 5/1986 | Lare ........................ 340/825.5 |
| 5,515,376 A | | 5/1996 | Murthy et al. ............ 370/85.13 |
| 5,867,731 A | * | 2/1999 | Williams et al. ............ 395/849 |
| 6,112,298 A | * | 8/2000 | Deao et al. .................. 712/227 |
| 6,320,859 B1 | * | 11/2001 | Momirov .................. 370/395.1 |
| 6,373,841 B1 | * | 4/2002 | Goh et al. ................... 370/389 |

* cited by examiner

Primary Examiner—Duc Ho

(57) ABSTRACT

A novel method of providing an external host processor with access to registers located in different clock domains. The method comprises the steps of translating host processor interface signals into internal register interface signals, and performing handshaking with the registers via the internal register interface. The handshaking includes supplying registers with a register access signal for enabling access to a selected register, and producing a register ready signal in response to the register access signal. Synchronization signals delayed with respect to the register ready signal may be used for synchronizing registers located in different clock domains with the processor interface.

19 Claims, 8 Drawing Sheets

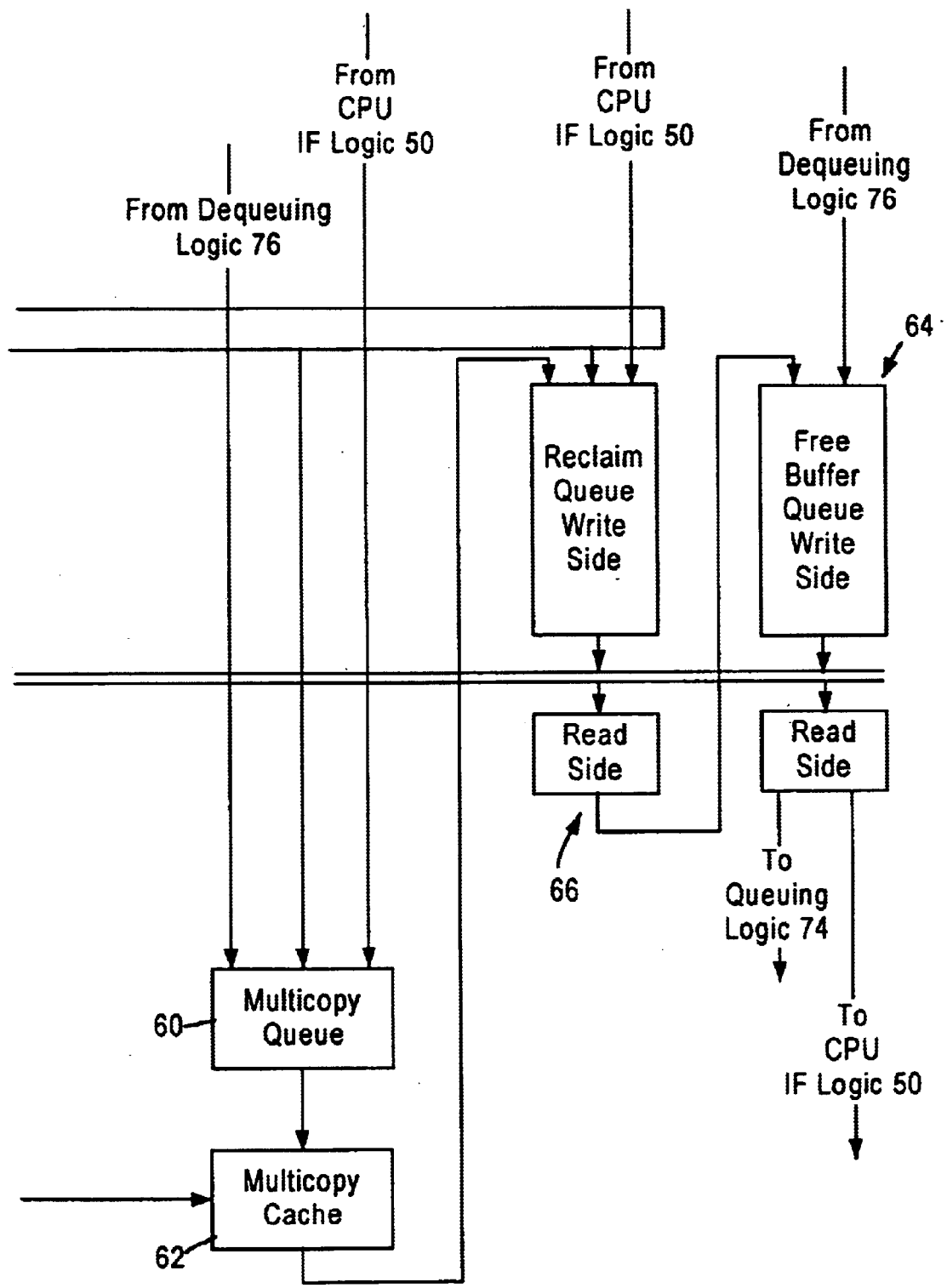

GENERIC REGISTER INTERFACE FOR ACCESSING REGISTERS LOCATED IN DIFFERENT CLOCK DOMAINS

FIELD OF THE INVENTION

This invention relates to data processing systems, and more particularly, to a network switch having a system for providing external CPU's access to registers run at different clock rates.

BACKGROUND ART

A network switch may be provided in a data communication network to enable data communication between multiple network nodes connected to various ports of the switch. A logical connection may be created between receive ports and transmit ports of the switch to forward received frames to appropriate destinations. The network switch may contain registers arranged in various blocks run at different clock rates, i.e. located in different clock domains.

It would be desirable to create a system for providing an external CPU with access to registers located in different clock domains. Also, it would be desirable to provide a generic register interface that supports register access by any external host connected to the network switch.

DISCLOSURE OF THE INVENTION

The invention offers a novel method of providing an external host processor with access to registers located in different clock domains. The method comprises the steps of translating host processor interface signals into internal register interface signals, and performing handshaking with the registers via the internal register interface.

The handshaking may include supplying the registers with a register access signal for enabling access to a selected register, and producing a register ready signal in response to the register access signal. Synchronization signals delayed with respect to the register ready signal may be used for synchronizing the host processor interface with the registers located in different clock domains.

In accordance with one aspect of the invention, data processing system connected to an external host processor comprises a host processor interface for providing interface to the host processor, a plurality of register modules located in different clock domains and having registers to be accessed by the host processor, an internal register interface for providing interface to the plurality of register modules, and a processor interface module coupled to the host processor interface for performing handshaking with the plurality of register modules to provide the host processor with access to the registers in the plurality of register modules. The processor interface module enables the internal register interface to support any external processor connected to the host processor interface.

In accordance with a preferred embodiment of the invention, the processor interface module may comprise a state machine responsive to the host processor interface for controlling access to the registers via the internal register interface. The state machine makes the transition to a starting state when the host processors access to a selected register is initiated. In response to initiation of the host processor's access, the state machine may produce a register access signal in the internal register interface to enable access to the selected register. A register module containing the selected register responds with a register ready signal. Thereafter, the register module may generate synchronization signals to provide synchronization with the processor interface module.

After receiving the synchronization signals, the state machine may deactivate the register access signal to finish the host processor's access. The register module may respond by deactivating the register ready signal and the synchronization signals.

In accordance with another aspect of the invention, a network switching system for switching data packets between multiple ports comprises a plurality of receive ports for receiving data packets, a decision making engine responsive to the received data packets for controlling transmission of the received data packets to a selected transmit port, a host processor interface for connecting a host processor, multiple register modules located in different clock domains, an internal register interface for providing interface to the multiple register modules, and a processor interface module coupled to the host processor interface for supporting host processor's access to registers located in different clock domains.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
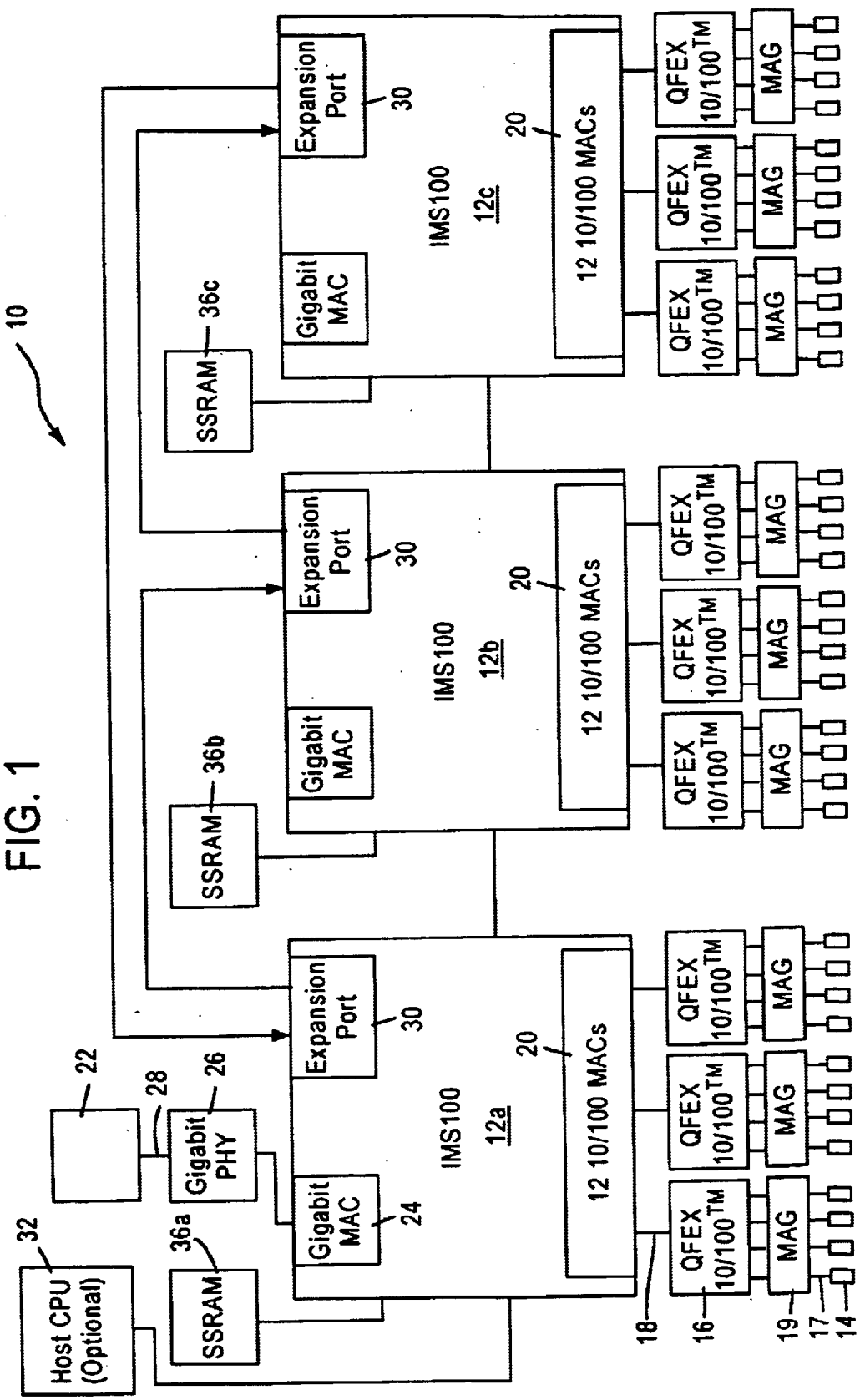
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding media independent interface (MII) 18. A magnetic transformer 19 provides AC coupling between the PHY transceiver 16 and the corresponding network medium 17. Each switch 12 also includes an expansion port for transferring data between other switches according to a prescribed protocol.

Figure 2:
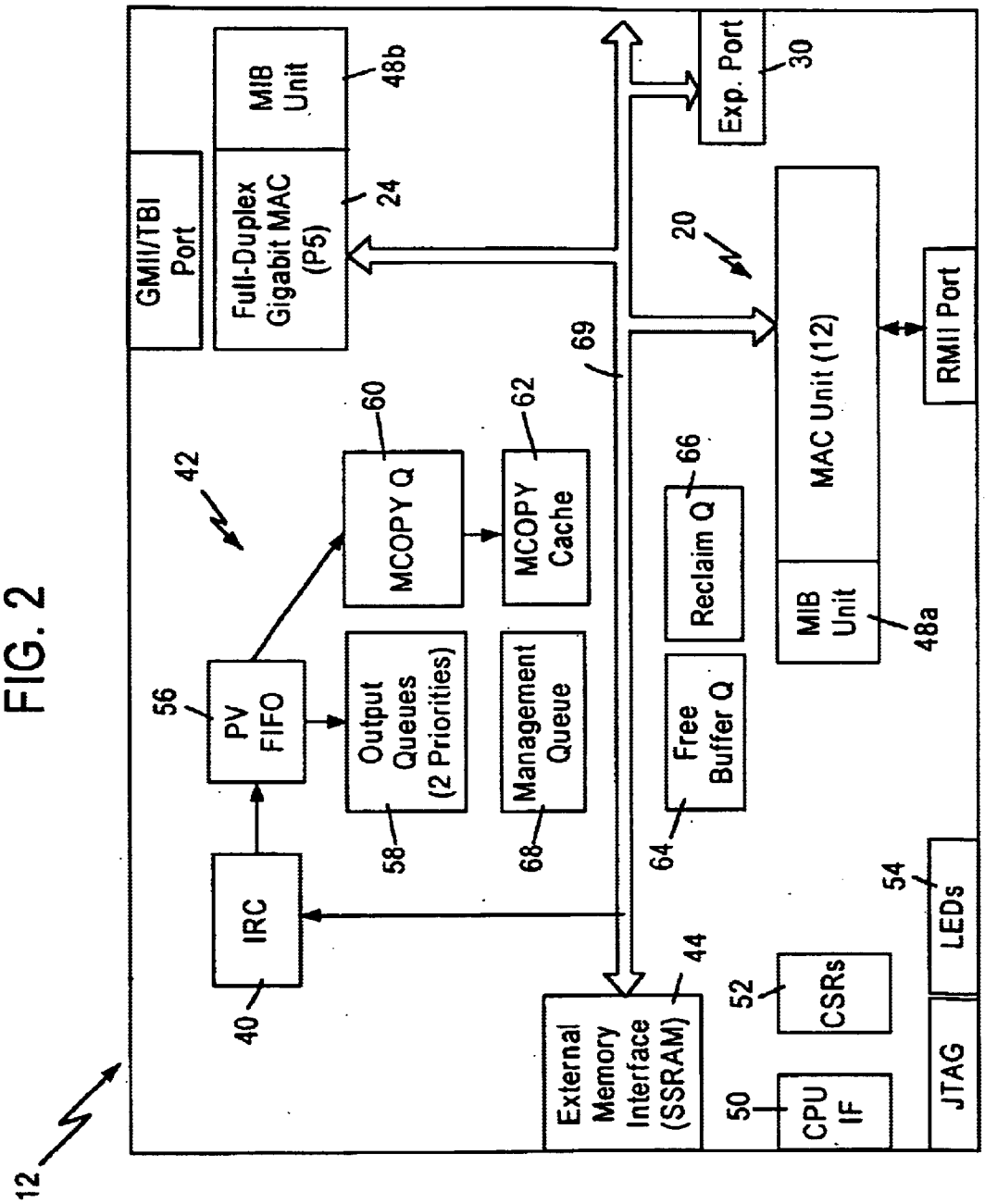
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, and memory structures. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining.

Additionally the external memory interface clock operates at clock frequencies of at least 66 MHz and, preferably, 100 MHz and above.

The switch 12 also includes a processor interface module 50 that enables an external management entity such as a host CPU 32 to control overall operations of the switch 12. In particular, the processor interface module 50 decodes CPU accesses within a prescribed register access space, and reads and writes configuration and status values to and from configuration and status registers 52.

The internal decision making engine 40, referred to as an internal rules checker (IRC), makes frame forwarding decisions for data frames received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet, including source, destination, and virtual LAN (VLAN) address information. The IRC 40 uses the header information to determine which MAC ports will output the data frame stored at the location specified by the frame pointer. The decision making engine may thus determine that a given data frame should be output by either a single port, multiple ports, or all ports (i.e., broadcast). Also, the IRC 40 may decide that the frame should not be forwarded to any port.

For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header. The IRC 40 may also determine that the received data frame should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the Processor interface module 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3:
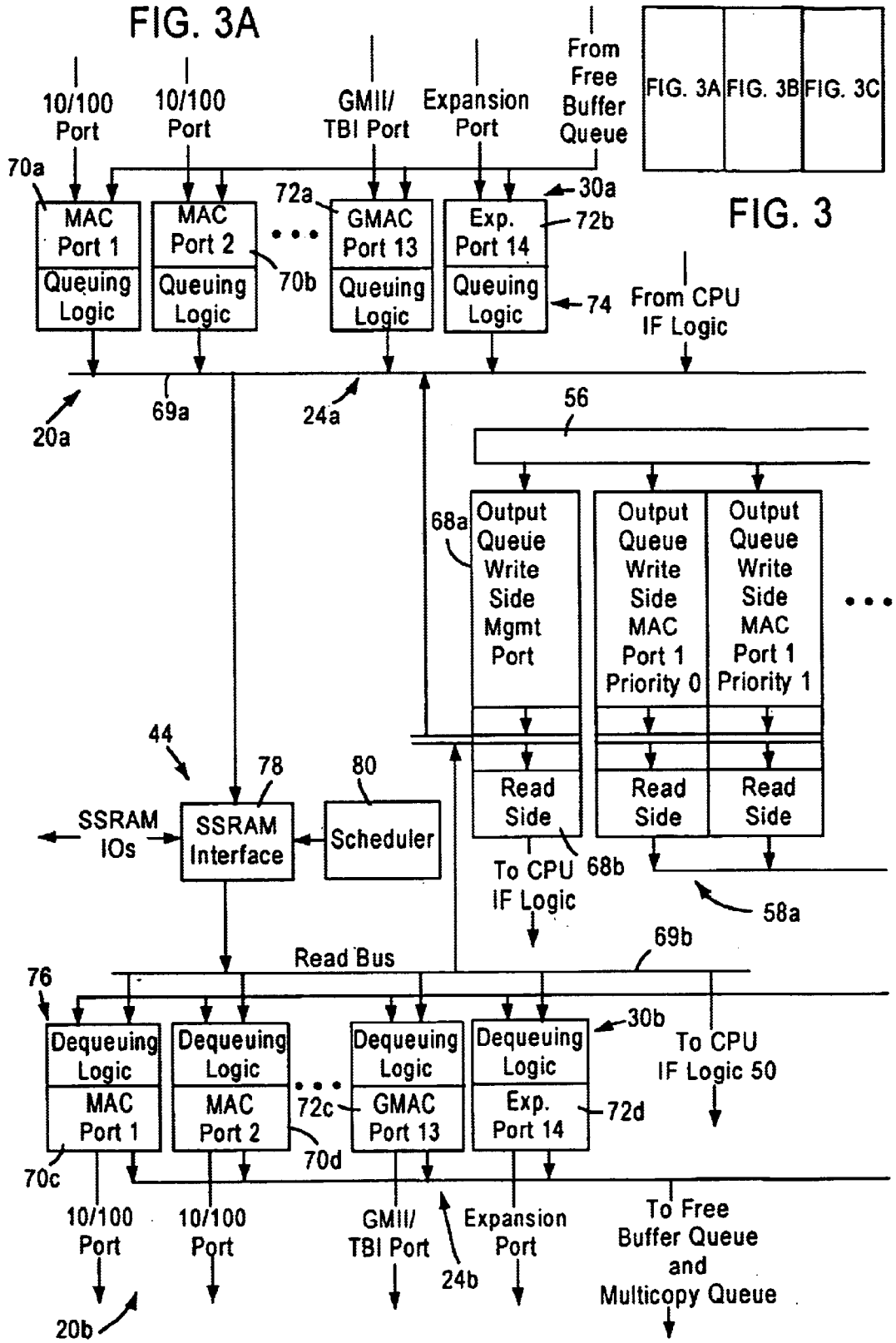
FIG. 3 is a block diagram illustrating in detail the switching subsystem of FIG. 2.
Figure 3B:
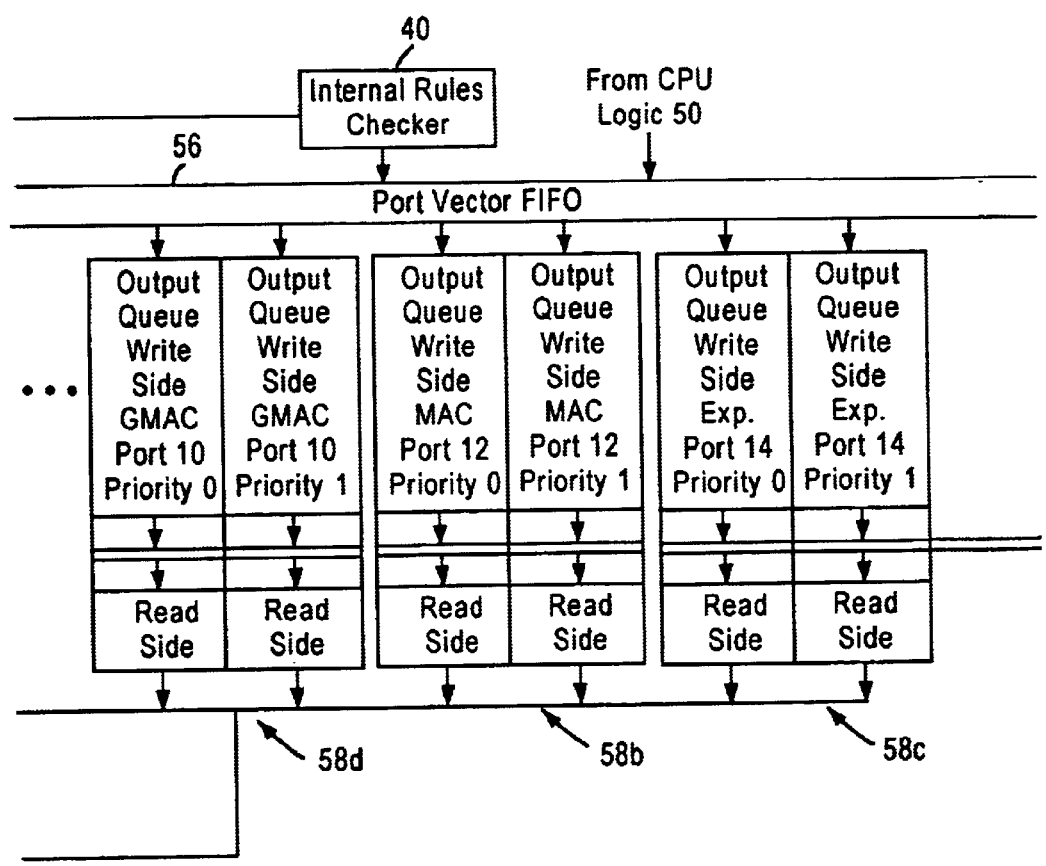

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 als+o includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 68 is processed separately by the host CPU 32 via the Processor interface module 50.

As shown in FIG. 3, each of the transmit MAC units 70d, 70e, 70f, 72d, and 72c have an associated output queue 58a, 58b, 58c, 58d, and 58e, respectively. Preferably, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58e for the gigabit transmit MAC 72c. The dequeuing logic 76 for the transmit gigabit port 24b takes the frame pointer from the corresponding gigabit port output queue 58e, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above in connection with FIG. 2, the processor interface (PI) module 50 enables an external management entity such as a host CPU 32 to control overall operations of the switch 12. The processor interface module 50 decodes CPU accesses within a prescribed register access space, and reads and writes configuration and status values to and from the configuration and status registers 52.

Figure 4:
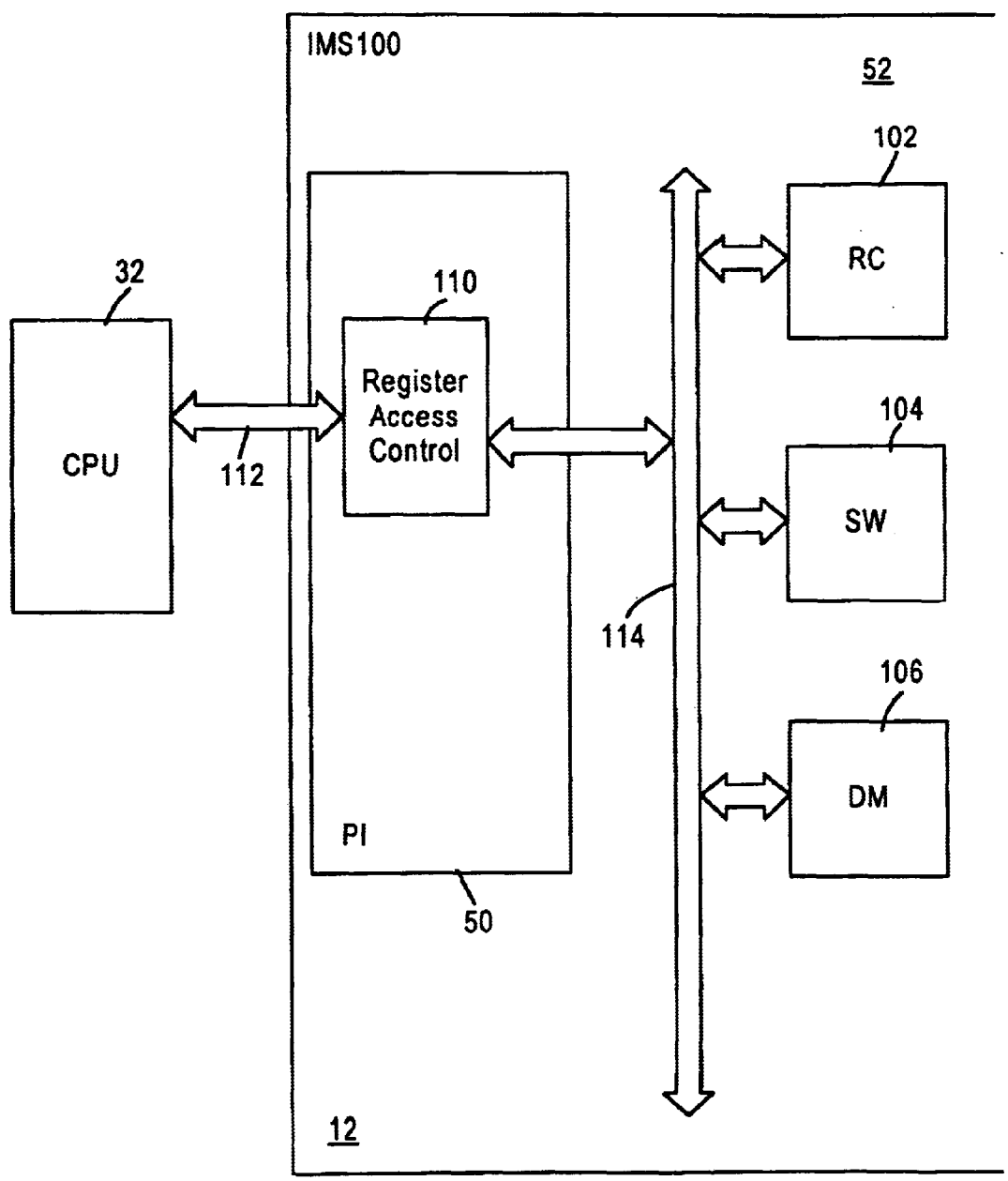
FIG. 4 is a block diagram illustrating interactions between a host CPU and registers located in different clock domains.

As shown in FIG. 4, the registers 52 are arranged in various modules of the switch 12. In particular, the registers 52 may be located in a Rules Checker (RC) module 102, a Switch (SW) module 104 and a Data MAC (DM) module 106.

For example, the RC module 102 contains such registers as IRC configuration register for defining the configuration of the IRC 40, physical address register for storing MAC address assigned to the switch 12, IRC hash register that allows the CPU 32 to program processing algorithms in the IRC 40, IRC learning and aging configuration register for enabling learning and aging functions of the IRC 40, etc. The SW module 104 contains port vector FIFO access register, multicopy queue access register, reclaim queue access register, etc. The DM module 106 contains PHY and MAC interrupt registers, LED configuration register, etc.

The modules 102, 104 and 106 are run at different clock rates, i.e. they are located in different clock domains. In accordance with the present invention, PI module 50 enables the CPU 32 to access registers located in different clock domains.

Specifically, the PI module 50 comprises a register access control block 110 that handles the CPU's access to the registers 52. The register access control block 110 functions as a PI state machine that enables the PI module 50 to perform handshaking with the CPU 32 and with the modules 102, 104 and 106 during read and write accesses to registers arranged in the modules 102, 104 and 106. The host CPU 32 is connected to the register access control block 110 via a CPU interface 112, which may be a bus for connecting the switch 12 to a host. The switch 12 supports 16-bit write and read transactions to enable the CPU 32 to write and read data to and from the registers 52. A generic register interface 114 connects the register access control block 110 to the modules 102, 104, and 106.

In accordance with the present invention, the register access control block 110 performs handshaking with the CPU 32 via the CPU interface 112, and with the register modules 102, 104 and 106 via the generic register interface 114. As a result, the CPU 32 is capable of accessing the registers located in different clock domains.

Figure 5:
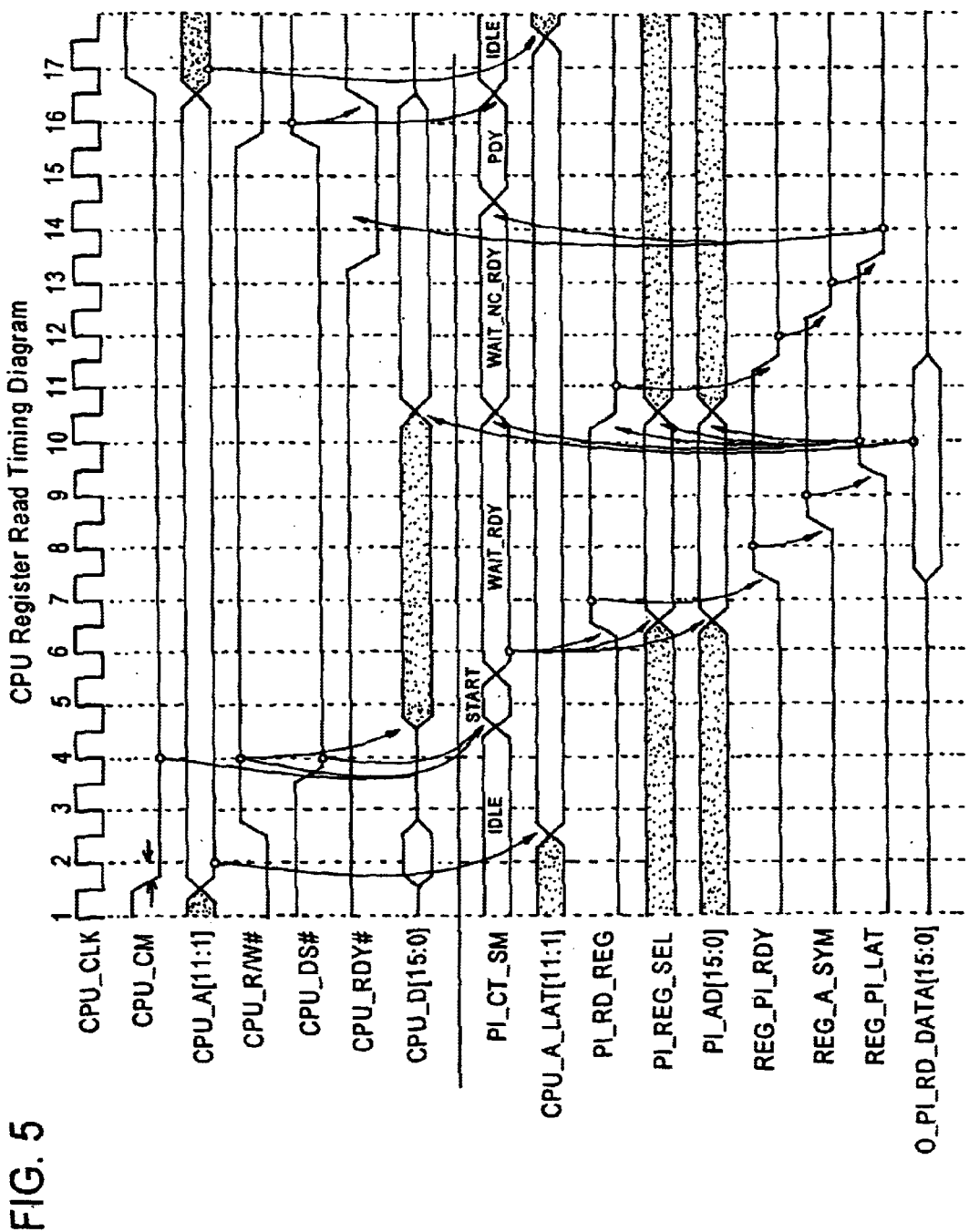
FIG. 5 is a timing diagram illustrating CPU read access to the registers.

FIG. 5 shows a timing diagram that illustrates operations performed during the CPU read access to a register in any of the register modules 102, 104 and 106. A signal PI_CT_SM in the middle of the diagram on FIG. 5 represents states of a PI state machine that controls handshaking. The signal waveforms shown in the upper portion of FIG. 5 above the signal PI_CT_SM illustrate signals transferred via the CPU interface 112. These signals are synchronous with respect to a CPU clock signal CPU_CLK, which runs at up to 33 MHz. The signal waveforms shown in the lower portion of FIG. 5 below the state machine signal PI_CT_SM illustrate handshaking via the generic register interface 114.

As shown in FIG. 5, the PI state machine waits in an IDLE state until the CPU 32 initiates read access to any register in the register modules 102, 104 or 106. The host CPU read access cycle is initiated when a chip select signal CPU_CS# and a CPU data strobe signal CPU_DS# in the CPU interface 112 are both sampled low on a rising edge of the CPU_CLK signal, and a CPU read/write enabling signal CPU_R/W# in the CPU interface 112 is sampled high on the same rising edge of the CPU_CLK signal. When this condition occurs (CPU_CLK cycle 4), the PI state machine (represented by the signal PI_CT_SM) makes the transition to a START state. Also, a data bus CPU_D[15:0] of the CPU interface 112 is set to a high impedance state to be ready for reading data.

Further, when the value of a CPU address signal CPU_A [11:1] in the CPU interface 112 becomes valid, this value is latched as a latched address signal CPU_A_LAT[11:1] into the generic register interface 114 on a rising edge of the CPU_CLK signal (CPU_CLK cycle 2) to indicate the address of the appropriate register.

The PI state machine remains in the START state for one cycle, and then, advances to a WAIT_READY state, in which it asserts a read register signal PI_RD_REG and produces a register select signal PI_REG_SEL, and a register address signal PI_AD[15:0]. The read register signal PI_RD_REG is a handshake signal asserted in the generic register interface 114 to enable reading data from the selected register. The register select signal PI_REG_SEL signal is produced in the generic register interface 114 to select a line for reading data from a particular register in the RQ module 102, SW module 104, or DM module 106. The register address signal PI_AD[15:0] in the generic register interface 114 is decoded by the modules 102, 104 and 106 to find the register to be read.

Thus, the PI state machine of the present invention translates CPU read access signals transferred via the CPU interface 112 into read access signals of the generic register interface 114.

When the selected register decodes its address, the module 102, 104, or 106 that contains the selected register generates a register ready signal REG_PI_RDY asserted in the generic register interface 114 to notify the PI module 50 that the selected register is ready. In response, the PI module 50 reads data G_PI_RD_DATA of the selected register via the generic register interface 114.

As the modules 102, 104 or 106 may be located in different clock domains with respect to the PI module 50, the register ready signal REG_PI_RDY should be synchronized with the PI module 50. To provide this synchronization, the module 102, 104, or 106 that contains the selected register asserts a synchronizing register ready signal REG_PI_SYN delayed by one CPU_CLK cycle with respect to the REG_PI_RDY signals, and a latched register ready signal REG_PI_LAT delayed by one CPU_CLK cycle with respect to the REG_PI_SYN signal.

On the next CPU_CLK rising edge after the REG_PI_LAT signal is asserted, the PI state machine makes the transition to a WAIT_NO_RDY state to deassert the read register signal PI_RD_REG and terminate the register select and register address signals PI_REG_SEL and PI_AD[15:0] in the generic register interface 114. Also, the PI state machine enables the CPU 32 to latch the read data value via the data bus CPU_D[15:0] of the CPU interface 112.

In response to the deassertion of the read register signal PI_RD_REG, the module 102, 104, or 106 that contains the selected register deasserts the register ready signal REG_PI_RDY to notify the PI module 50 that the read access is terminated. To provide synchronization with the PI module 50, the module 102, 104 or 106 deasserts the synchronizing register ready signal REG_PI_SYN with a delay by one CPU_CLK cycle with respect to the REG_PI_RDY signals, and a latched register ready signal REG_PI_LAT with a delay by one CPU_CLK cycle with respect to the REG_PI_SYN signal.

When the latched register ready signal REG_PI_LAT is deasserted, the PI state machine makes the transition to a RDY state, in which it deasserts a CPU ready signal CPU_RDY# in the CPU interface 112 to terminate the CPU read access. When the CPU data strobe CPU DS is sampled high on a rising edge of the CPU_CLK signal (CPU_CLK cycle 16), the CPU_RDY# signal is asserted to prepare the switch 12 for the next read or write access, and the PI state machine makes the transition to the IDLE state. Further, when the CPU address pins CPU_A[11:1] are sampled to be set in a high impedance state on the rising edge of the CPU_CLK signal (CPU_CLK cycle 17), the latched address lines CPU_A_LAT[11:1] of the generic register interface 114 are set to a high impedance state.

Figure 6:
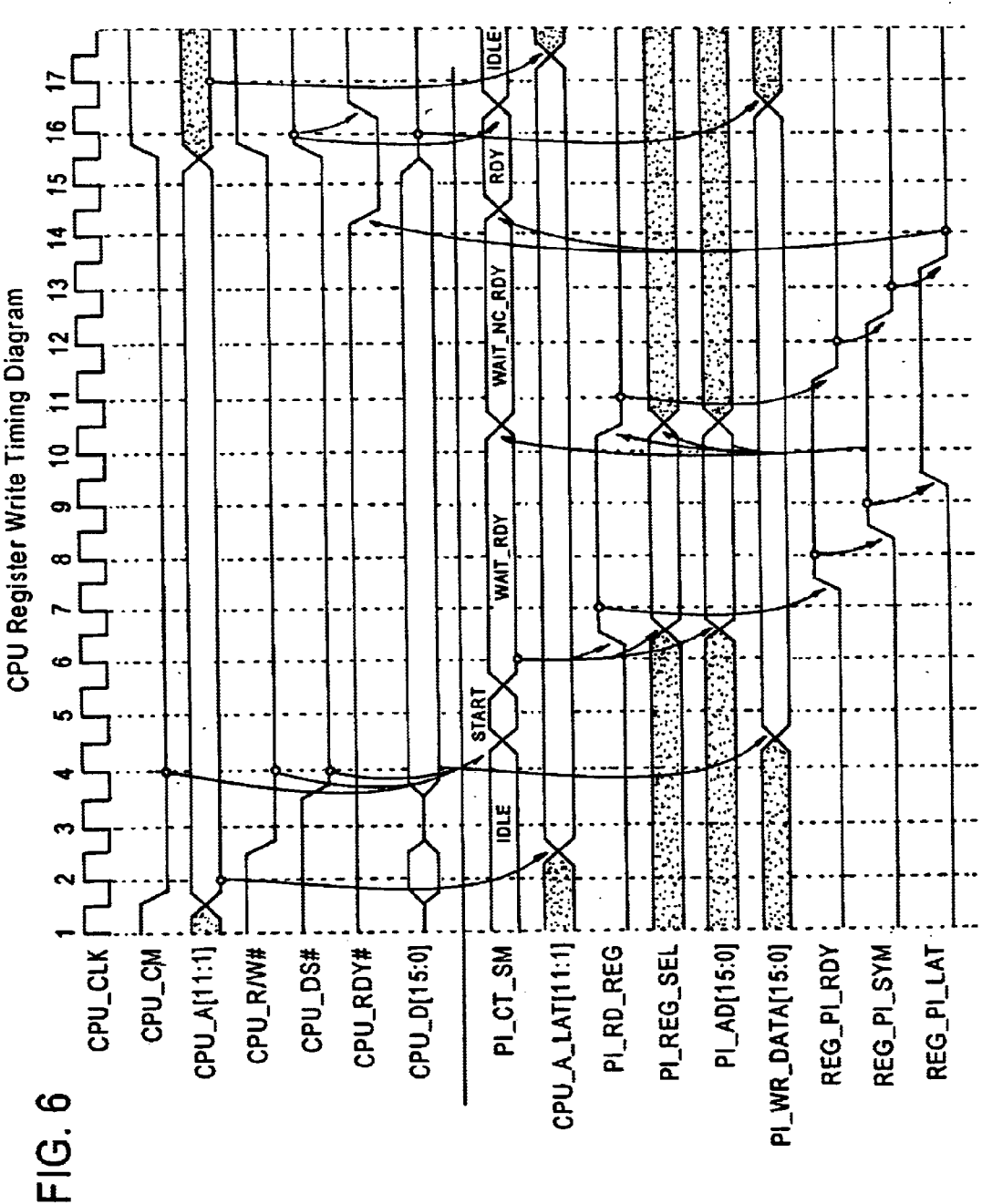
FIG. 6 is a timing diagram illustrating CPU write access to the registers.

FIG. 6 shows a timing diagram that illustrates operations performed during the CPU write access to a register in any of the register modules 102, 104 and 106. A signal PI_CT_SM in the middle of the diagram on FIG. 6 represents states of the PI state machine during the write access. The signal waveforms shown in the upper portion of FIG. 6 above the signal PI_CT_SM illustrate signals transferred via the CPU interface 112. The signal waveforms shown in the lower portion of FIG. 6 below the state machine signal PI_CT_SM illustrate handshaking via the generic register interface 114 during the write access.

As shown in FIG. 6, the host CPU write access cycle is initiated when a chip select signal CPU_CS# and a CPU data strobe signal CPU_DS# in the CPU interface 112 are both sampled low on a rising edge of the CPU_CLK signal, and a CPU read/write enabling signal CPU_R/W# in the CPU interface 112 is sampled low on the same rising edge of the CPU_CLK signal. When this condition occurs (CPU_CLK cycle 4), the PI state machine makes the transition from the IDLE state to the START state, and the CPU data bus signal CPU_D[15:0] is latched via a data bus PI_WR_DATA[15:0] of the generic register interface 114 to carry data to be written into a selected register.

As illustrated in FIG. 6, operations performed by the PI state machine during the CPU write access are similar to the read access operations discussed above. However, instead of asserting the register read signal PI_REG_RD, the PI state machine in the WAIT_RDY state asserts a register write signal PI_WR_REG to enable writing data to a select register in the RQ module 102, SW module 104 or DM module 106.

Thus, the PI module 50 translates signals in the CPU interface 112 into generic register interface signals, and performs handshaking with the appropriate register module 102, 104 or 106 to provide CPU read or write access to a selected register. As a result, the generic register interface 114 capable of supporting any external processor connected to the switch 12 provides external processor's access to registers located in different clock domains.

In this disclosure, there are shown and described only the preferred embodiments of the invention, but it is to be understood that the invention is capable of changes and modifications within the scope of the inventive concept as expressed herein.

What is claimed is:

1. A data processing system connected to an external host processor, comprising:
    a host processor interface for providing interface to the host processor,
    a plurality of register modules located in different clock domains and having registers to be accessed by the host processor,
    an internal register interface for providing interface to the plurality of register modules, and
    a processor interface module coupled to the host processor interface for performing handshaking with the plurality of register modules via the internal register interface to provide the host processor with access to the registers in the plurality of register modules.

2. The system of claim 1, wherein the processor interface module enables the internal register interface to support any external processor connected to the host processor interface.

3. The system of claim 1, wherein the processor interface module comprises a state machine responsive to the host processor interface for controlling access to the registers via the internal register interface.

4. The system of claim 3, wherein the state machine makes a transition to a starting state when host processor's access to a selected register is initiated.

5. The system of claim 4, wherein the state machine produces a register access signal in the internal register interface in response to initiation of the host processor's access.

6. The system of claim 5, wherein a register module of the plurality of register modules produces a register ready signal in the internal register interface in response to the register access signal.

7. The system of claim 6, wherein the register module generates synchronization signals in the internal register interface after producing the register ready signal, to provide synchronization with the processor interface module.

8. The system of claim 7, wherein the state machine deactivates the register access signal to finish the host processor's access, after receiving the synchronization signals.

9. The system of claim 8, wherein the register module deactivates the register ready signal and the synchronization signals in response to deactivation of the register access signal.

10. A network switching system for switching data packets between multiple ports, comprising:

a plurality of receive ports for receiving data packets, a decision making engine responsive to the received data packets for controlling transmission of the received data packets to a selected transmit port, a host processor interface for connecting a host processor, multiple register modules located in different clock domains and having registers to be accessed by the host processor, an internal register interface for providing interface to the plurality of register modules, and a processor interface module coupled to the host processor interface for supporting host processor's access to the registers in the plurality of register modules.

11. The system of claim 10, wherein the processor interface module enables the internal register interface to support any host connected to the host processor interface.

12. The system of claim 10, wherein the processor interface module comprises a register access control circuit responsive to the host processor interface for controlling access to the registers via the internal register interface.

13. The system of claim 12, wherein the register access control circuit is configured for translating signals in the host processor interface into signals in the internal register interface.

14. The system of claim 12, wherein the register access control circuit is configured for performing handshaking with the register modules via the internal register interface when host processor's access is initiated.

15. The system of claim 10, wherein the register modules generates synchronization signals in the internal register interface to synchronize the register modules located in different clock domains with the processor interface module.

16. A method of providing an external host processor with access to registers located in different clock domains, comprising the steps of:

translating host processor interface signals into signals in an internal register interface, and performing handshaking with the registers via the internal register interface.

17. The method of claim 16, wherein the step of handshaking includes supplying the registers with a register access signal for enabling access to a selected register.

18. The method of claim 17, wherein the step of handshaking further includes producing a register ready signal in response to the register access signal.

19. The method of claim 18, wherein the step of handshaking further includes producing a synchronization signal delayed with respect to the register ready signal.

* * * * *